April 8, 1941. A. G. HATCH ET AL 2,237,828
METHOD OF AND APPARATUS FOR FORMING FIBER CAN BODIES
Filed Sept. 30, 1937 7 Sheets-Sheet 1
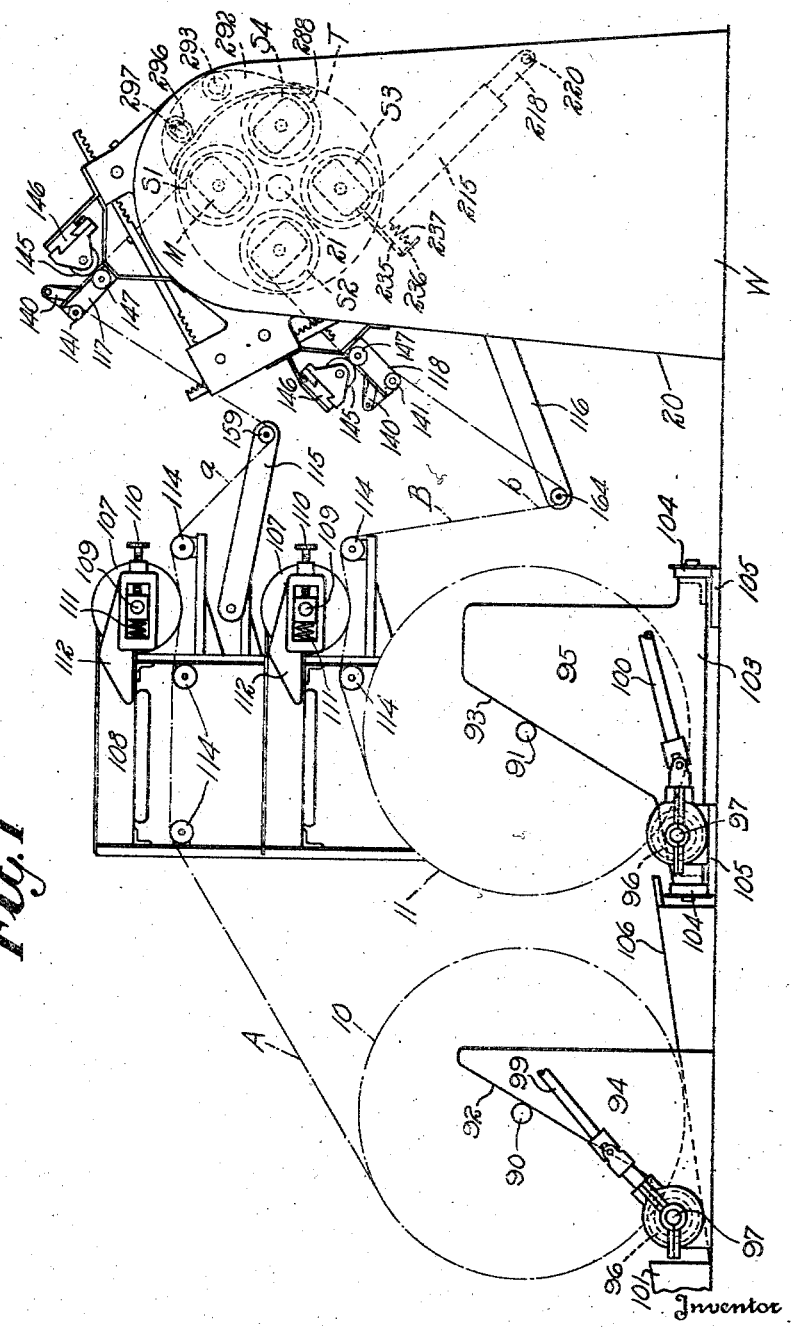
Inventor
ALEXANDER G. HATCH
ROBERT S. CONDON
By N. Clay Lindsey
Attorney

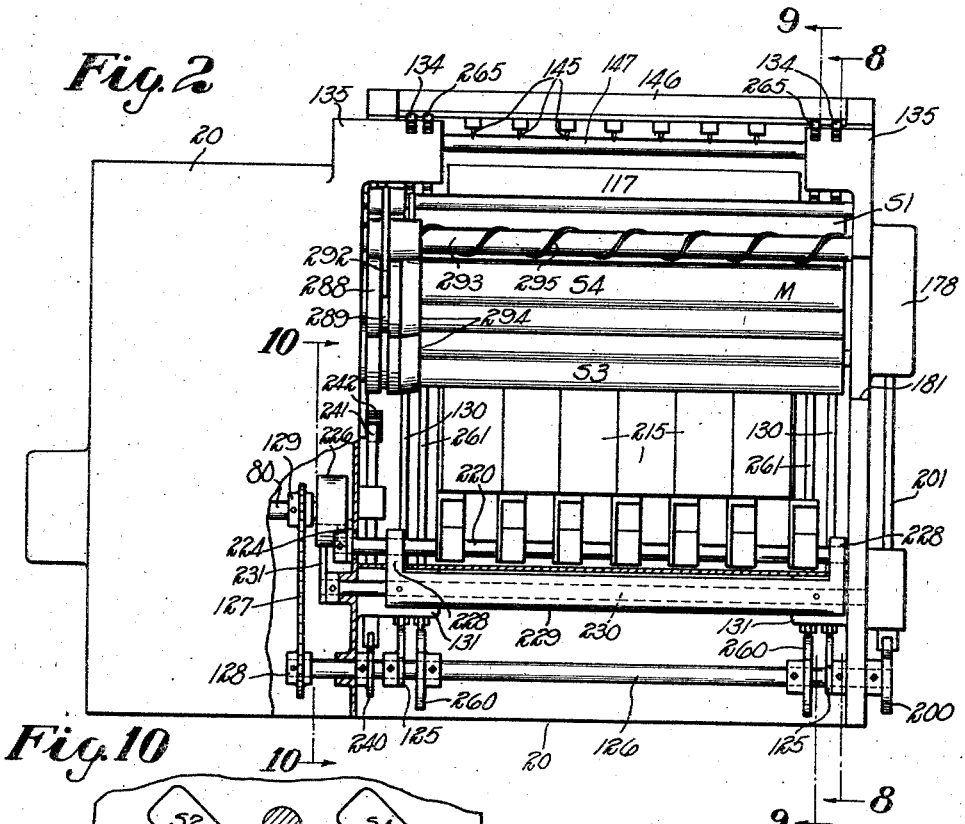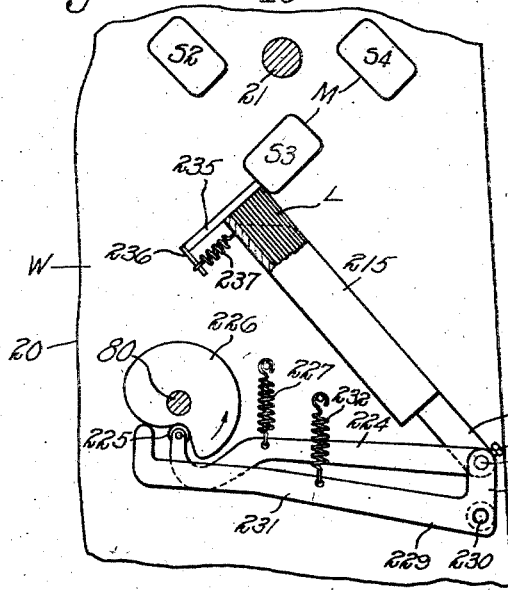

April 8, 1941.  A. G. HATCH ET AL  2,237,828
METHOD OF AND APPARATUS FOR FORMING FIBER CAN BODIES
Filed Sept. 30, 1937  7 Sheets-Sheet 3

Inventor
ALEXANDER G. HATCH
ROBERT S. CONDON
By N. Clay Lindsey
Attorney

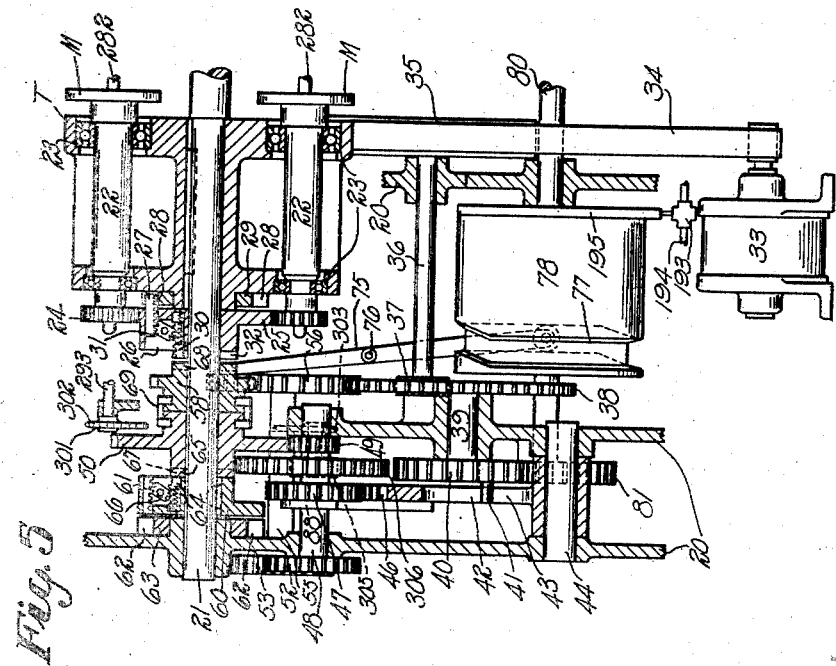
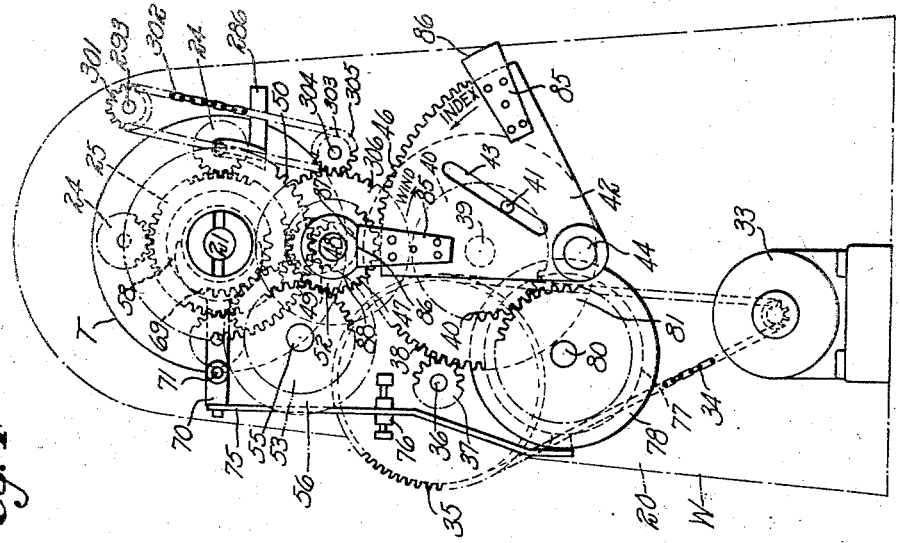

April 8, 1941.  A. G. HATCH ET AL  2,237,828
METHOD OF AND APPARATUS FOR FORMING FIBER CAN BODIES
Filed Sept. 30, 1937  7 Sheets-Sheet 5

Inventor
ALEXANDER G. HATCH
ROBERT S. CONDON
By W. Clay Lindsey.
Attorney

April 8, 1941.   A. G. HATCH ET AL   2,237,828
METHOD OF AND APPARATUS FOR FORMING FIBER CAN BODIES
Filed Sept. 30, 1937   7 Sheets-Sheet 6
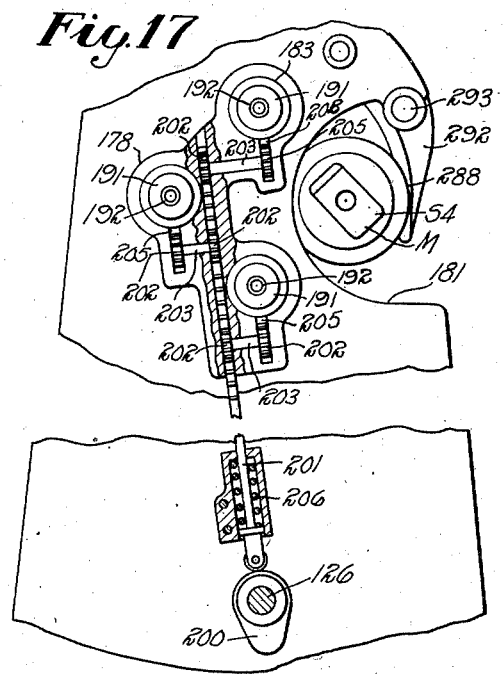
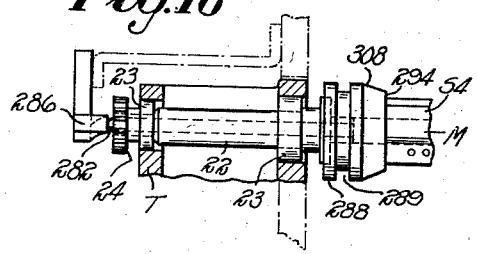
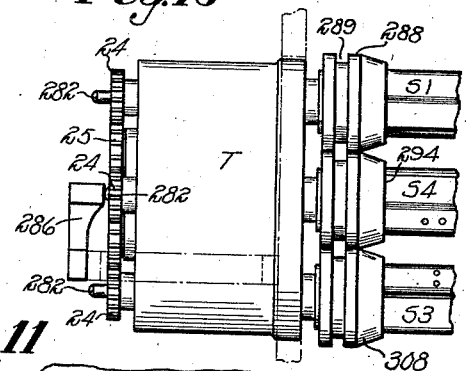
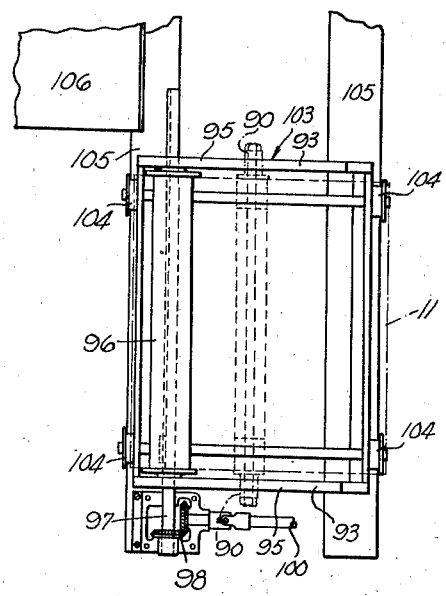
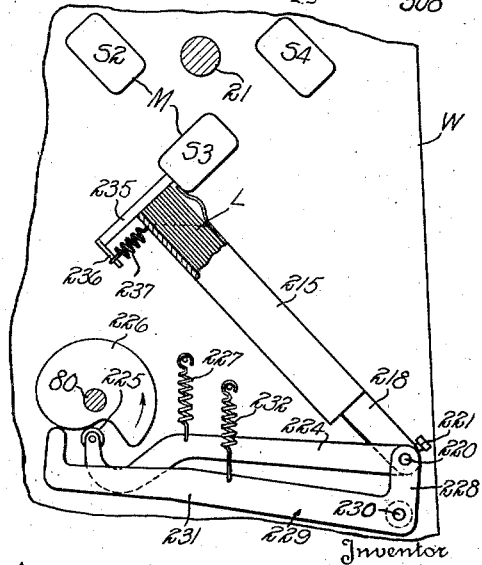
ALEXANDER G. HATCH
ROBERT S. CONDON
By N. Clay Lindsey
Attorney April 8, 1941.    A. G. HATCH ET AL    2,237,828
METHOD OF AND APPARATUS FOR FORMING FIBER CAN BODIES
Filed Sept. 30, 1937    7 Sheets-Sheet 7
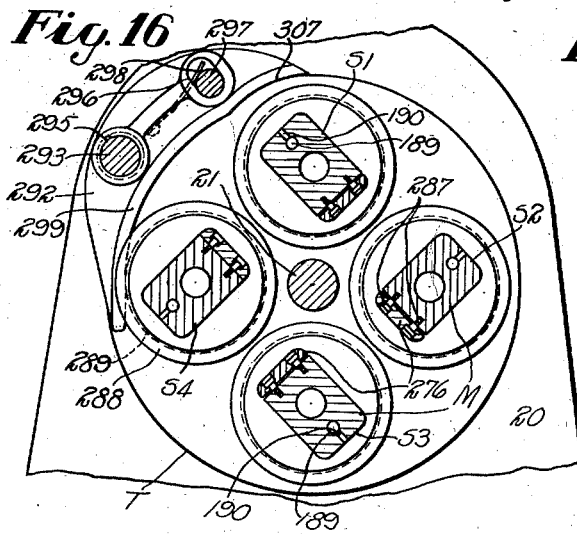
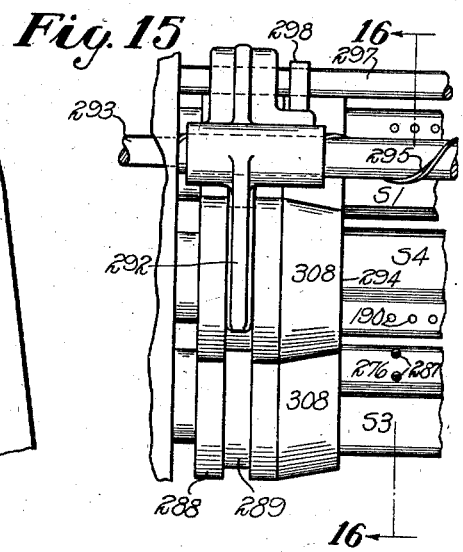
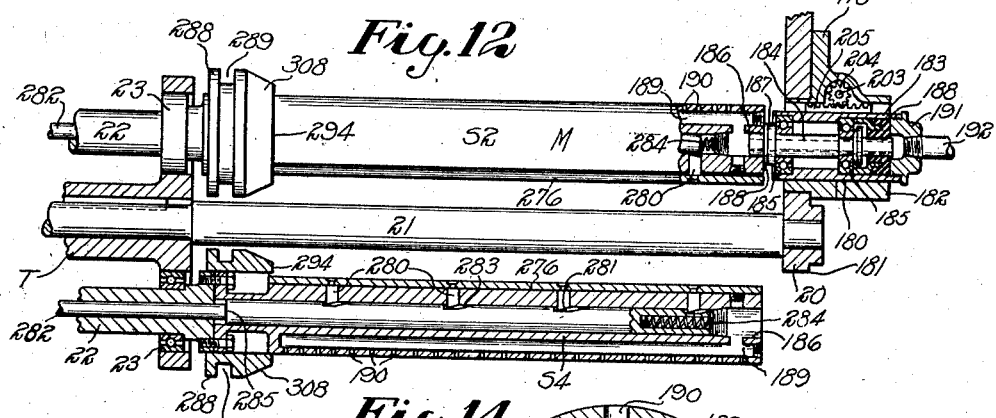
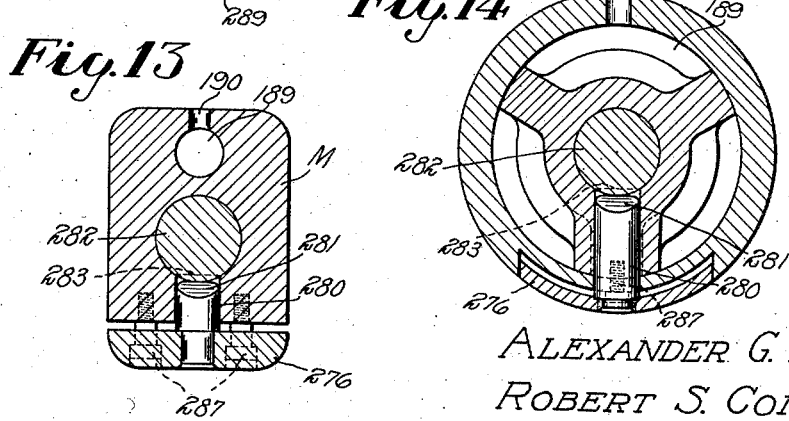
Inventor
ALEXANDER G. HATCH
ROBERT S. CONDON
By W. Clay Lindsey
Attorney Patented Apr. 8, 1941

2,237,828

UNITED STATES PATENT OFFICE 2,237,828

METHOD OF AND APPARATUS FOR FORMING FIBER CAN BODIES

Alexander G. Hatch and Robert S. Condon, Rutland, Vt., assignors to Fibre Can Development Corporation, Rutland, Vt., a corporation of Vermont Application September 30, 1937, Serial No. 166,598

47 Claims. (Cl. 93—81)

This invention relates to a method of and apparatus for forming fiber can bodies.

The primary aim of the invention is to provide an improved method of and machine for manufacturing, with facility and at a higher rate of speed and, therefore, at a lower cost, can bodies formed by convolutely winding one or more strips of paper or the like into tubular form, the strips of material being preferably supplied from rolls.

It is a further aim of the invention to provide an improved apparatus having various features of novelty and advantage and which is particularly characterized by its simplicity in construction, considering the many functions which it performs, by its effectiveness in operation, and the speed and facility with which it is capable of producing fibrous can bodies and applying labels thereto at a minimum expense and at an extremely rapid rate.

Our improved method and machine may be employed for making fiber can bodies of various constructions, such, for example, as standard unlined can bodies composed of a single strip of heavy paper or the like convolutely wound and having a label applied thereabout; or the so-called "shouldered" can body comprising an inner container convolutely wound and an outer container convolutely wound about the inner container and of greater length than the inner container and preferably with a label applied to the outside of the can body; or fiber can bodies having an inner container or lining wound into tubular form and preferably composed of material impervious to selected fluids, and an outer container closely fitting and wound about the inner container and preferably composed of a strip of relatively coarse, fibrous material, the two containers being closely united by a cementitious material and there preferably being a label about the outer container.

With these and other objects in view, this invention resides in the unique construction, in the combination of members hereinafter fully described, illustrated in the accompanying drawings, and referred to in the claims appended hereto; it being understood, of course, that various changes in the general form, proportion, and size, as well as other minor details of construction lying within the scope of the claims may be resorted to without departing from the spirit or the general method of the invention or sacrificing any of the advantages thereof.

In the accompanying drawings which illustrate one embodiment which the present invention may take:

Figure 1 shows the general assembly of the invention and the method of producing the can bodies;

Fig. 2 is a side view of the winding machine which is partly broken away to show the construction;

Fig. 4 is an end view of the drive associated with the winding and indexing mechanisms;

Fig. 5 is a fragmentary sectional view showing the driving mechanism;

Fig. 7 is a fragmentary plan view taken substantially along line 7—7 of Fig. 6 and showing the drive associated with one of the parent rolls;

Fig. 10 is a fragmentary enlarged view in side elevation taken substantially along the line 10—10 of Fig. 2 and showing the label applying mechanism, parts being omitted for purpose of clearness;

Fig. 11 is a view similar to Fig. 10 and showing how a label is removed from the label pocket;

Fig. 12 is an enlarged fragmentary view in longitudinal section through the turret and two of the mandrels and showing the air suction connection with one of the mandrels;

Fig. 13 is a vertical section through a mandrel of rectangular cross section;

Fig. 14 is a vertical section through a cylindrical mandrel;

Fig. 15 is a fragmentary side elevation of the mandrels and can ejecting mechanism;

Fig. 16 is a vertical section taken substantially along the line 16—16 of Fig. 15;

Fig. 17 is a fragmentary end view showing the mechanism to shift the rear center supports into and out of mandrel engagement;

Figs. 18 and 19 are fragmentary views showing the operation of a release mechanism which reduces the size of a mandrel during ejection of a can therefrom.

Figure 20:
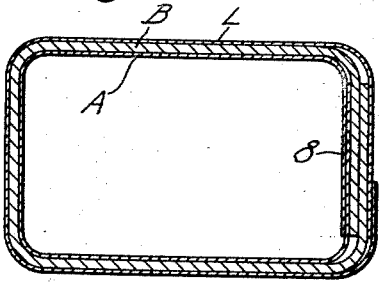
Fig. 20 shows a cross section through a finished can body.

As previously stated, a machine constructed in accordance with the present invention may be employed for forming can bodies of various sorts and applying labels thereto, such, for example, as standard unlined can bodies or shouldered can bodies, but for purposes of illustration, the following description will proceed on the assumption that the machine is to be employed for use in the manufacture of can bodies comprising an inner container wound into tubular form and having an overlapped glued seam, and an outer container, preferably formed of a stiff, coarse, fibrous material, closely wound about the inner container and adhering thereto, the overlapping portions of the outer container being glued together and a label being applied to the outer container. Such a can body is shown by way of illustration only in Fig. 20, it being understood that the present disclosure and description are by way of illustration and not by way of limitation. In Fig. 20, the can body is shown as comprising an inner container or lining A, an outer container or body B, and a label L. The inner container or lining A may be composed of a strip of thin, flimsy material with impervious characteristics, such, for example, as very thin metal foil, or thin sheets of cellulose derivatives, such as Cellophane or glassine, thin parchment paper, etc. The inner container is wound upon a mandrel M to form a tube of suitable cross section with an overlap 8 which is pasted to form a fluid tight seal. Wound about the inner container is a stiff strip of cardboard, heavy coarse paper, or similar fibrous material forming the outer container. The outer surface of the inner container and the inner surface of the outer container are preferably glued together throughout substantially the entire exterior area of the lining. By preference, in forming the can, glue is applied to the outer surface of the strip forming the lining and to the outer surface of the strip from which the outer container is formed so that in winding this latter strip about the lining, the inside surface of the outside tube will firmly adhere to the lining, the overlapping portions of the two containers will be sealed, and a label will adhere tightly to the outside of the can body.

For convenience, the strip materials of which the can bodies are formed are hereafter referred to in the specification and claims as "paper," but it will be understood, of course, that the term "paper" is used in a broad sense as including any suitable fibrous or other flexible strip material suitable for forming into can bodies.

The improved apparatus (see Fig. 1) for producing these can bodies generally comprises a winding machine W operated by a suitable source of power and having an indexible turret T rotatably supporting a plurality of similar spaced mandrels M arranged to be indexed by the successive stations; the illustrated machine having four such mandrels which are indexible to the successive work stations S1, S2 and S3, and unloading station S4. Paper strips A and B are automatically fed from the supply or parent rolls 10 and 11 against adhesive coating mechanisms and over supporting tables to be successively and individually wound in overlapped formation to provide the inner and outer containers which adhere in tight interfitting relation and provide a substantially unitary can body. During each winding operation, suitable pressure mechanism, including lay-down rolls R, respectively press the paper strips tightly into overlying adhesive contact, and cut off mechanism cuts off the wound strips substantially at the completion of each winding operation. In the present showing, the inner container is illustrated as composed of a thin water-proofed lining strip A, such as glassine, Cellophane, or similar suitable material, wound onto the mandrel at station S1, and the heavy, stiff body paper B is wound on over a previously wound lining strip at station S2 while a labelling operation is being simultaneously performed at station S3 and an unloading operation is occurring at station S4. It will be understood, however, that the lining strip need not be limited to a thin water-proofed strip as shown, it being obvious that the inner container may be formed of a relatively heavy strip of paper of lesser width than the width of the strip from which the outer container is formed in order to provide a fiber can body having an internal shoulder spaced slightly from either end, and which shoulders are adapted to receive end closures, the end closures being held in place by turning over the ends of the outer container.

Referring to the apparatus as illustrated in the drawings, the winding machine W is provided with a casing or frame 20 in which is journalled a turret shaft 21 having the indexible turret T secured thereto. The turret rotatably supports a plurality of spaced mandrels and herein shown as four uniformly spaced mandrels M provided at their left-hand ends with supporting shafts 22 mounted in suitable bearings 23. The left-hand end of each shaft 22, as viewed in Fig. 5, is provided with a pinion 24 enmeshed with a clutch gear 25 journalled on shaft 21 and arranged to impart simultaneous rotation to all of the mandrels or lock them against rotation in predetermined positions. Gear 25 is recessed at 26 and slidably supports a lock bar 27 longitudinally movable into and out of locking engagement with one of a plurality of peripherally spaced slots 28 in a plate 29 secured to the turret. A bar 30, also slidably mounted in gear 25 for longitudinal movement, is normally spring pressed away from the turret as shown in Fig. 5. Bars 27 and 30 are provided with opposed rack teeth meshed with a rotatable gear segment 31 so that bar 27 normally tends to enter into locking engagement with one of the slots 28 to nonrotatably connect gear 25 to the turret and prevent rotation of the mandrels M with respect to the turret during an indexing operation. Gear 25 has clutch teeth 32, and bar 30 extends outwardly with relation to these teeth for engagement wtih a driving member to unlock bar 27 from the turret during mandrel rotation, as will be later described.

A suitable source of power, such as an electric motor 33, operates the various mechanisms in desired cooperative relation. This motor is shown connected by a drive chain 34 and a sprocket 35 to a shaft 36 having a gear 37 enmeshed with a gear 38 on a shaft 39 journalled in the frame. A gear 40 on the end of the shaft 39 has an eccentrically mounted, laterally projecting pin 41 slidably and rotatably received in a slot 43 of a gear segment 42 mounted on a shaft 44 in the frame. This slot is preferably radial to the axis of shaft 44, and the pin 41 oscillates the segment back and forth through a predetermined distance. When the segment swings to the right (Fig. 4) to perform a winding operation of the mandrels, pin 41 operates in the upper end of the slot, resulting in a relatively slow winding movement of the mandrels, and when the segment swings in an opposite direction to perform an indexing of the turret, pin 41 operates in the lower end of the slot, causing a relatively rapid indexing movement. When the segment is respectively located at its extreme positions of movement, a radial line from the axis of shaft 39 to the pin axis is at right angles to the slot. The revolution of pin 41 about shaft 39 at a constant rate will result in a harmonic oscillatory movement of the segment so that the segment will swing from a state of rest at one end of the stroke with a gradual acceleration to a maximum speed at the middle of its stroke, and thereafter gradually decelerate until it stops at the other end of its stroke. This harmonic motion provides for particularly smooth and rapid winding and indexing operations wherein the shock of bringing mechanisms up to their full speed and the shock of bringing mechanisms back to rest is, to a large measure, avoided and thus a higher rate of machine operation is obtainable.

Segment 42 has gear teeth 46 adapted to mesh with a gear 47 secured to a shaft 48 journalled in the frame. A pinion 49 fastened on shaft 48 meshes with a gear 50 journalled on turret shaft 21, and a gear 52 fastened to shaft 48 meshes with a gear 53 on an intermediate shaft 55 carrying a gear 56 meshed with a gear 58 journalled on shaft 21 adjacent gear 50. It will thus be evident that the swinging movement of segment 42 in response to motor 33 acts through gear trains to simultaneously rotate gears 50 and 58 on shaft 21 at different rates and in the opposite direction.

A clutch plate 60 secured to shaft 21 between the frame and gear 50 slidably supports a locking mechanism similar to that in gear 25. A locking rack bar 61 is slidably mounted in the clutch plate for movement into and out of locking engagement with one of a plurality of slots 62 in a member 63 secured to the frame. A spring pressed rack bar 64 slidable in plate 60 normally projects outwardly beyond clutch teeth 65 in the plate disposed towards gear 50 and the rack portions are connected by a rotatable gear segment 66.

Drive gears 50 and 58 are respectively provided with clutch teeth 67 and 68 selectively engageable with the clutch teeth 65 and 32 of plate 60 and gear 25. The adjacent inner ends of gears 50 and 58 have grooved portions receiving a clutch yoke 69 on a link 70 slidable on a shaft 71 substantially parallel to shaft 21. The upper end of a lever 75 pivoted in the frame at 76 is suitably connected with link 70, and the lower end of the lever is provided with a projection slidably received in the track 77 of a drum cam 78 mounted on a shaft 80. A gear 81 secured to shaft 80 meshes with gear 40 so that cam 78 is rotated at a fixed rate by motor 33, and gears 50 and 58 are cyclically slid back and forth along shaft 21 into selective driving engagements with plate 60 and gear 25 to provide alternate indexing of the turret and rotation of the mandrels, Spring pressed bars 64 and 30 normally maintain the lock bars 61 and 27 in locking relation with their respective slots, and bars 64 and 30 are respectively engaged by gears 50 and 58 to remove the locking bars from locked relation when the respective clutch members are in driving engagement. Hence, when gears 50 and 58 are moved to the left, as viewed in Fig. 5, a driving engagement exists between gear 50 and plate 60 to index the turret. At this time, gear 58 is out of engagement with gear 25 and bar 27 is in locked relation with a slot 28 so that the mandrels cannot rotate in the turret. Similarly, when cam 78 shifts the gears 50—58 to the right to provide driving relation between gears 58 and gear 25, bar 27 is withdrawn from locked position and bar 61 enters into locked position so that the turret is locked against rotation and the mandrels are unlocked for rotation. This locking and unlocking movement and engagement of the various clutch members occurs during a dwell between segment 42 and gear 47, as will be later described. It will be understood that the gear trains have been so chosen that the turret will be indexed to the next successive position and, in the present showing, through a quarter revolution each time. The relative sizes of gears 24 and 25 are so chosen that each mandrel is rotated sufficiently to provide the desired extent of individual overlap of the paper strips wound into the shape of the can body. It will be appreciated that this overlap may result from between one and two mandrel rotations as shown, or the gears may be changed to provide several overlapping convolutions or coils of each strip.

Segment 42 has its teeth cut away at each end, as illustrated in Fig. 4, so that the segment will run out of enmeshed engagement with gear 47 just before it reaches the end of its stroke, causing a dwell at the ends of each segment oscillation. Locking plates 85 respectively project upwardly from the sides of the segments adjacent its tooth free portions, and the upper ends of these plates terminate in curved faces 86 which slidably mate with a similarly curved face 87 in a disk member 88 fastened to shaft 48. The enmeshed relation of the segment 42 and gear 47 is such that a single rotation is imparted to gear 47 upon each segment oscillation so that a slidable locking engagement occurs between surfaces 86 and 87 at the end of each segment stroke. This engagement of faces 86 and 87 prevents rotation of shaft 48 at this time and provides a dwell of predetermined extent between the segment and the gear trains operated thereby. During this dwell, drive gears 50 and 58 are held from rotation and the drum cam 78 operates to shift the gear assembly 50—58 to its respective clutch engaged positions. These driving connections will be made and broken in the required positions since segment 42 and gear 47 run into and out of meshed engagement with the opposing clutch teeth matingly aligned and the locking bars 27 and 61 aligned with their respective locking slots. Hence, the various parts cannot get out of timed relation.

The parent rolls 10 and 11 containing the strips of paper stock are mounted upon arbors 90 and 91 having their outer ends respectively engaging inclined faces 92 and 93 of pairs of spaced uprights 94 and 95. Uprights 94 are rigidly secured in position, and uprights 95 form part of a car, to be later described. Rolls 10 and 11 respectively rest upon driving rolls 96 located between the lower ends of the uprights and rearwardly of the arbors so that rolls 96, arbors, and the inclined surfaces cooperate to support the parent rolls. Rolls 96 are mounted on shafts 97 journalled in the uprights and driven by bevelled gears 98 respectively operated by driving shafts 99 and 100 in a manner to be later described. The outer ends of the rolls may be flanged to aid in guiding the paper as it is removed therefrom. Since the parent rolls are peripherally driven, the paper will be removed at a fixed rate irrespective of the size of the parent rolls.

Figure 6:
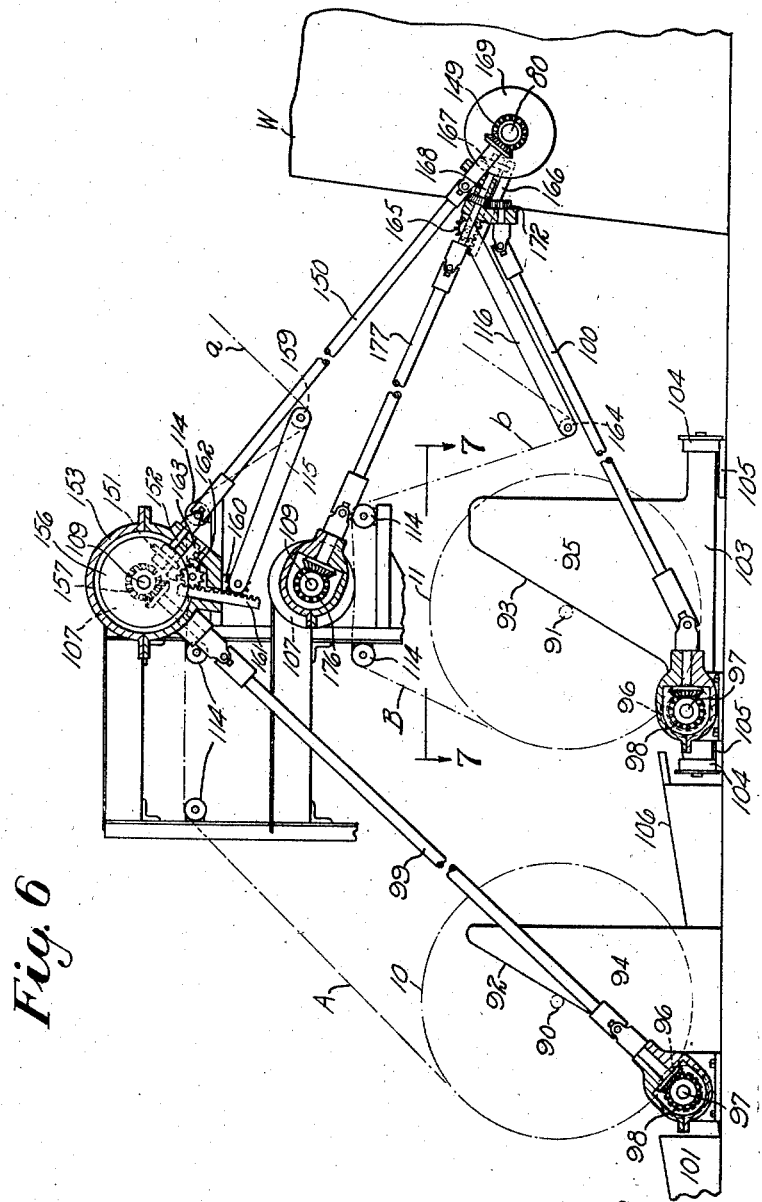
Fig. 6 illustrates the adjustable drive associated with the parent and glue rolls.

An incline 101 is provided rearwardly of parent roll 10 and adjacent the driving roll 96, as shown in Figs. 1 and 6, so that parent roll 10 may be easily pushed up this incline and over roll 96 into the operative position illustrated. The parent roll 11, which is located forwardly of the roll 10 when in operative position, is supported on a car 103 from which the uprights 95 extend. This car is mounted on wheels 104 engaging rails 105. Driving roll 96 associated with the parent roll 11 is secured in slidable driving relation on its shaft 97, as illustrated in Fig. 7, and an incline 106 similar to incline 101 is located to one side of parent roll 10. Car 103 may be moved along the rails until the slidable roll 96 is located adjacent the upper end of incline 106, after which parent roll 11 may be pushed up incline 106 and into position in the same manner as described with relation to parent roll 10. The car may thereafter be pushed back to the position illustrated in Fig. 7 to locate parent roll 11 in operative position.

The lining and body strips respectively engage adhesive coating mechanisms herein illustrated as including a tray 104 supported on a suitable framework and having one side cut away to receive a glue roll 107 mounted on a shaft 109. Shaft 109 is journalled at its opposite ends in bearings slidably mounted in brackets 112 and movable towards and from the tray by suitable screw feeds 110 and springs 111 so that each roll 107 is movable towards and from the tray to control the amount of adhesive removed. The bottoms of the glue rolls respectively engage the upper faces of strips A and B supported by guide rolls 114.

From the glue rolls, strips A and B assume the respective depending loops $a$ and $b$ which are controlled in size by feed arms 115 and 116, to be later described. The strips feed from these loops onto tables 117 and 118 intermittently movable towards and from the mandrels at stations S1 and S2.

Figure 8:
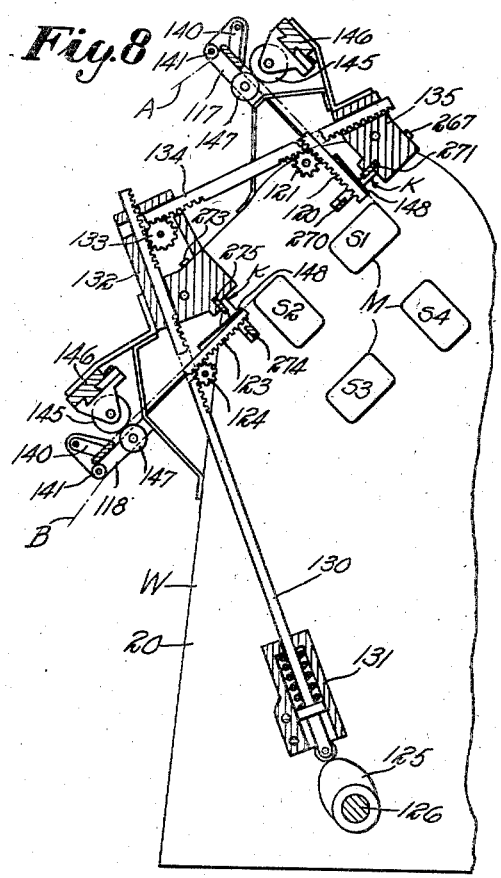
Fig. 8 is a fragmentary sectional view taken substantially along the line 8—8 of Fig. 2 and showing the table feeding mechanism.

Feed tables 117 and 118, as illustrated in Figs. 1, 2, and 8, are of generally similar construction comprising flat plates supporting the strips A and B and arranged for slidable movement in siutable brackets towards and from the mandrels at stations S1 and S2. Table 117 is mounted on a pair of rack bars 120 enmeshed with pinions 121 rotatable in the frame 20, and table 118 is similarly mounted on a pair of spaced racks 123 meshed with pinions 124 on a shaft journalled in the frame.

A pair of spaced table cams 125 are mounted on a cam shaft 126 journalled in the frame and rotated from shaft 80 by a chain 127 interconnecting sprockets 128 and 129 respectively secured on shafts 126 and 80 (Fig. 2). The table cams 125 engage rollers at the lower ends of push rods 130 slidably mounted in brackets 131 and 132 on the frame.

Coiled springs in brackets 131 maintain the push rods 130 at all times responsive to cams 125. The upper ends of the push rods have rack teeth respectively enmeshed with pinions 124 and also enmeshed with pinions 133 rotatable in brackets 132. Rack bars 134 slidable in brackets 132 and 135 mesh with pinions 133 and 121. Table cams 125 move push rods 130 upwardly, causing a simultaneous inward movement of the tables to the positions shown in Fig. 8 where the forward table ends are adjacent the mandrels at stations S1 and S2. This table infeed occurs during the dwell prior to a rotation of the mandrels. The ends of the paper strips extend beyond the advancing table ends so that the strip ends are respectively located in overlying relation to the mandrels at the start of a winding operation. Suction mechanism associated with the mandrels, and to be later described, thereafter secures the lining strip in position. During the ensuing winding operations at stations S1 and S2, the paper strips pass under guide rolls 141 at the rear of the tables and beneath back locks 140 which overlie the paper strip and serve in the capacity of ratchets to prevent rearward paper feed on the tables.

Each table is cut away between its ends to receive a series of spaced rotary cutters 145 adjustably mounted on suitable brackets 146 and located in opposition to a backing roll 147 so that the edges of cutters 145 will cut the lining strips and body strips into desired widths depending upon the length and type of can bodies required. The forward end of each table carries a guide plate 148 overlying the paper strip to aid in guiding it into initially located position prior to a winding operation and permitting the strip to be pulled therebeneath during the winding operation.

Table cams 125 serve simultaneously to retract the tables from the positions of Fig. 8 and rearwardly of cut-off knives K during the latter part of the winding operation. These cut-off knives, which will be later described, are then operated to simultaneously cut off the paper strips A and B between the forward ends of the tables and the mandrels just prior to the completion of the winding operation. Lay-down rolls R, to be later described, and engageable with the paper strips on the mandrels during the winding operation, press the cut off loose ends of the strips into adhesive contact with the convolution of the strip therebeneath.

Referring now to the drive for parent roll 10 and the upper glue roll 107, shaft 80, which is constantly rotated by the motor, is connected by bevelled gears 149 and shaft 150 to a driving wheel 151 slidable in driven relation on a shaft 152 journalled in a housing 153. The upper glue roll shaft 109 is journalled in housing 153 and has a driven plate 156 secured thereon. Plate 156 has a side face in driven contact with the periphery of wheel 151, and shaft 109 is connected through bevelled gears 157 to drive shaft 99 which operates parent roll 10 through gears 98 and roll 96.

The depending loop $a$ of lining strip A, as shown in Figs. 1 and 6, supports a guide roll 159 on the outer end of arm 115 which normally extends downwardly, as shown. A pinion 160 connected to the pivotally mounted inner end of arm 115 is meshed with a rack 161 slidable in housing 153. A second rack 163 is slidable in the housing parallel to shaft 152 and has a slotted portion receiving wheel 151. A pinion 162 in the housing is enmeshed with the racks 161 and 163 so that a downward movement of arm 115 in response to increase in length of loop $a$ will result in a slidable movement of wheel 151 away from the axis of plate 156 to reduce the rate at which the strip is fed from parent roll 10. When loop $a$ becomes of lesser extent, arm 115 is moved upwardly, correspondingly resulting in a movement of wheel 151 towards the center of plate 156 to increase the driving rate of parent roll 10. Hence, a driving rate is always provided for the strip A commensurate with the amount of paper withdrawn onto the mandrel, and sufficient slack is provided in loop a to compensate for the variation in the intermittent feed of the table 117 and the feed imparted to parent roll 10.

The drive to parent roll 11 and the lower glue roll 107 is similarly controlled through the swinging arm 116 having a roller 164 at its outer end supported in the bottom of a depending loop b of the body strip B. The inner pivotally mounted end of arm 116 is connected by a pinion 165 and a slidable rack 166 to a driven wheel 167 in slidable driving engagement on a shaft 168 and peripherally and slidably engageable with a driving plate 169 secured on shaft 80. Upward and downward swinging movement imparted to arm 116 in response to the extent of depending loop b will result in a suitable variation of drive from plate 169 to wheel 167 and through a shaft 177 and bevelled gears 176 to the lower glue roll shaft 109. Driving connections are maintained between shaft 168 and shaft 100, as by bevelled gears 172 so that the same variation of drive will exist between parent roll 11 and the lower glue roll. The shafts 99, 100, 150, and 177 may be connected to the various driving mechanisms at their opposite ends, as by suitable universal joints as shown.

The mandrels M which are respectively secured at their inner ends to the drive shafts 22 are also arranged to be supported at their outer ends at stations S1, S2, and S3 only during rotation and in such manner that a reduced air pressure may enter hollow portions of the mandrels and communicate with ports therein to aid in initially securing and maintaining the lining strip A to the mandrel in each of these stations during winding operations. The rearward portion of the frame 20 is provided with a housing 178 (Fig. 2) having three retractable tubular arbors 180 axially aligned with the rearward end of the mandrels at stations S1, S2, and S3, as illustrated in Figs. 12 and 17. The remaining mandrel when at station S4 is not axially supported at its outer end, but is aligned with a cut away portion 181 at the rear of the frame (Fig. 17) so that the finished can bodies may be ejected during the winding operations and in a manner to be later described. Since these mandrel supports are of similar construction, the description of one will suffice. Each support generally comprises a casing 182 slidably supporting a sleeve 183 within which is journalled a tubular arbor 184 on bearings 185. The left-hand end of arbor 184 (Fig. 12) is slidably received within a bore 186 at the outer end of a mandrel, and a shoulder 187, having suitable packing, is adapted to abut against the end of the mandrel forming a substantially air-tight joint. A suitable packing 188 may also be provided between the outer end of the arbor and casing 182.

The mandrels may be of any suitable cross section. dependent upon the shape and type of can bodies required. Two shapes of mandrels—namely, for rectangular and cylindrical can bodies—are illustrated in Figs. 13 and 14. Each of these mandrels is provided with a hollow chamber 189 extending substantially throughout its length and having a series of spaced ports 190 communicating therewith and with an outer face of the mandrel. Passage 189 also communicates with the bore 186 so that reduced air pressure passing through the tubular arbor will produce a suction at ports 190 to aid in securing the end of lining strip A in position. It will be understood, of course, that the gear drive for mandrel rotation is so chosen that ports 190 are located beneath the forward end of each lining strip A at the start of each winding operation. Sleeve 183 is provided at its outer end with a cap 191 having a bore therethrough in which is threaded a pipe 192 flexibly connected as by a rubber hose (not shown) to a valve 193 in a suction supply line 194. Valve 193 is operated by a cam 195 at the right-hand end of drum cam 78, as shown in Fig. 5. Cam 195 is shaped to open the suction valve when the extended end of strip A is initially presented to the mandrel at station S1 just prior to each winding operation and to close the valve at the completion of each winding operation. Since there is no arbor or suction connection to the mandrel at station S4, the cans may be ejected therefrom during a mandrel rotation, as will be later described.

A center operating cam 200 on shaft 126 moves a push rod 201 having rack teeth on its upper end meshed with pinions 202 on shafts 203 in casings 182, as shown in Fig. 17. Pinions 204 on shafts 203 are meshed with racks 205 on sleeves 183 to simultaneously withdraw the arbors from supporting relation with the respective mandrels (Fig. 12). A spring 206 maintains push rod 201 under control of cam 200. Center cam 200 is shaped to cyclically operate push rod 201, causing the supporting arbors 184 to withdraw from the mandrels during the dwell prior to an indexing operation of the turret and to return the arbors to mandrel supporting relation during the ensuing dwell just prior to the following mandrel rotation.

A labelling operation is performed on the can bodies at station S3 while the lining material A is being wound on the mandrel at station S1 and the body strip B is being applied over a lining strip at station S2. As illustrated in Figs. 1, 2, 10, and 11, the labelling mechanism includes a series of duplicate spaced box shaped label pockets 215 containing stacks of labels L and respectively mounted on the upper ends of upwardly projecting arms 218 adjustably secured to a rock shaft 220 as by screws 221. The pockets are adjustably and respectively positioned beneath each of the can bodies and arranged to be simultaneously swung upwardly to engage the uppermost labels with the respective can bodies at station S3 just prior to mandrel rotation. A cam lever 224 is secured at one end to the rock shaft 220 and a roller 225 on the other end of the lever engages a labelling cam 226 on shaft 80. A spring 227 engages lever 224 to hold roller 225 in cam contact. Shaft 220 is journalled in two upwardly extending arms 228 of a bell crank 229 mounted on a shaft 230 journalled in the frame 20 and having a substantially horizontally extending arm 231 urged by a spring 232 into engagement with cam 226.

A bracket 235 slidably fastened to the upper end of the pocket has a lug 236 underlying the bottom of the pocket and connected thereto by a coiled spring 237 which tends to maintain the upper end of bracket 235 extending slightly beyond the top of the pocket.

Cam 226 is so shaped that roller 225 shifts suddenly from a high point to a low point of the cam during the dwell just prior to a winding operation, thus causing a rapid upward swinging movement of the label pocket towards the mandrel at station S3. During this movement, the bracket 235 initially strikes the body paper B wound on the mandrel and spring 237 partially yields and permits the pocket 15 to continue upward until stopped by the labels. Thus the label pocket moves upward until the stack of labels is pinched between the can body and the bottom of the label pocket, as shown in Fig. 10. The upper end of the uppermost label of the pack adheres to the adhesive coating on the outer surface of body strip B wound about the mandrel. Further rotation of the cam 226 at this time effects a downward movement of the arm 231 so that a slight upward sliding movement of the label pocket is brought about with respect to the upper end of the top label which is adhering to the mandrel. A wave is thus formed in the top label just behind the mandrel, and thus any tendency of the next to the top label to stick to the top one is overcome. The forward end of the top label thus being freed from the remaining labels before winding the label on the can body, the possibility of winding two or more labels at the same time is avoided. During the following mandrel rotation, the label pockets are gradually lowered until roller 225 again snaps from the high point to the position of Fig. 10.

Figure 3:
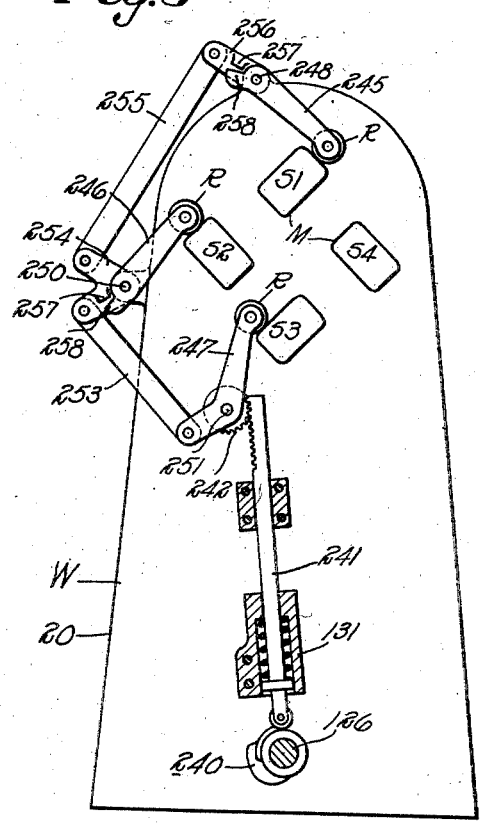
Fig. 3 is a fragmentary end view of the winding machine showing the operation of the lay-down rolls.

Shaft 126 is also provided with a lay-down cam 240 engaging a roller on the end of a spring pressed push rod 241 mounted within suitable guides in the frame and having a rack portion at its upper end enmeshed with a pinion 242 (Fig. 3). Lay-down rolls R are journalled at the ends of lay-down arms 245, 246, and 247 respectively urging the rolls into overlying engagement with the paper strips A and B at stations S1 and S2 and with the label at station S3. Arms 245, 246, and 247 are respectively supported on shafts 248, 250, and 251 mounted in frame 20. Pinion 242 is secured to arm 247, and a link 253 pivotally connects the arm 247 to the lower arm of a bell crank 254 journalled on shaft 250, and a link 255 pivotally connects the upper arm of a bell crank 254 to a lever 256 journalled on shaft 248. The lower arm of bell crank 254 and lever 256 are respectively provided with lugs 257 engageable with lugs 258 at the outer ends of lay-down arms 245 and 246 in response to an upward movement of push rod 241.

Lay-down cam 240 is so shaped that an upward movement is imparted to push rod 241 to lift the respective lay-down rolls R from can engagement during the dwell following a winding operation and to drop these rolls into can engagement at the start of the next winding operation. In the present instance, a slight lost motion exists between each pair of lugs 257 and 258 so that the rolls on arms 245 and 246 will first contact the strips at stations S1 and S2 before winding and the label at station S3 may advance under its lay-down roll before it is engaged thereby. In the illustrated showing, the rolls engage the cans under gravity, but various spring mechanisms could also be employed to press these rolls against the can bodies.

Figure 9:
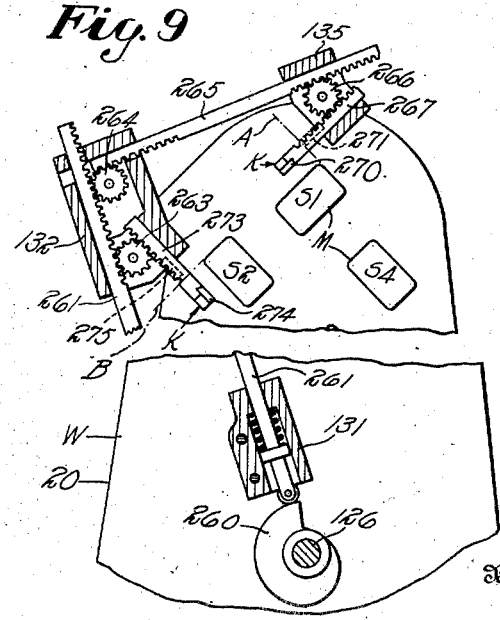
Fig. 9 is a sectional view taken substantially along the line 9—9 of Fig. 2 and showing the cut off mechanism.

The cut-off knives K are controlled by a pair of spaced cut-off cams 260 (Figs. 2 and 9) mounted on shaft 126. These cams 260 cooperate to actuate similar mechanisms, one of which is shown in Fig. 9. Each cam engages a roller on the end of a spring pressed push rod 261 having a rack portion at its upper end slidable in bracket 132 and enmeshed with a pair of rotatable pinions 263 and 264 in this bracket. Pinion 264 also enmeshes with a cross rack 265 slidable in brackets 132 and 135, and a pinion 266 rotatable in bracket 135 enmeshes with rack 265 and with a rack 267 slidable in bracket 135 towards and from strip A. The lower end of rack 267 has a knife 270 removably secured thereto and movable relatively to a fixed knife 271 mounted on the frame to cut off paper strip A. Similarly, a rack 273 meshed with pinion 263 and slidable in bracket 132 carries a knife 274 at its lower end for movement relative to a fixed knife 275 on the frame to cut off strip B.

The sets of knives 270 and 271 and 274 and 275 are located in straddling relation to the ends of tables 117 and 118 when the table is advanced towards the mandrels at stations S1 and S2, and the cut-off cams 260 are so shaped as to produce a movement of these sets of knives to cut off the strips A and B just prior to the completion of a winding operation and while the tables 117 and 118 are withdrawn from between the knives. The cam 240 operating the lay-down rolls R does not withdraw these lay-down rolls from cam engagement until after the cut off operation and during the ensuing dwell prior to an indexing of the turret, so that the entire length of the cut off strip is wound into tight adhesive relation.

It will be observed that the cutting operation is effected while the paper strip is moving and during the winding operation, and after the strip is cut off, the tail end thereof is wound onto the mandrel at the same station and without interrupting the winding operation. Also, after another mandrel has been indexed to the station S1, the forward edge of the strip from the roll is advanced and immediately engaged with the new mandrel so that the next winding operation can proceed with facility. These features permit of a high rate of operation of the machine and eliminate the necessity of an additional station for winding the tail end of the strip after it has been cut.

The mandrels are each provided with a release mechanism which reduces the size of each mandrel when it reaches station S4 just prior to an ejecting operation and prevents binding of the finished can bodies thereon. Each mandrel has a binding plate 276 supported on a plurality of spaced studs 280 mounted in the body portion of the mandrel for slidable movement towards and from the axis of mandrel rotation. The inner ends of the studs 280 have sloping cam faces 281 respectively engageable with corresponding cam faces 283 on rods 282 axially slidable in each mandrel and having outwardly projecting rounded ends extending from the shafts 22 as illustrated in Figs. 5, 18, and 19. As shown in Fig. 12, a coiled spring 284 between the rearward end of each of these rods and the mandrel normally urges the rod towards the left until a shoulder 285 on the rod engages the end of shaft 22, causing the engagement of cam faces 283 and 281 to move the plates 276 outwardly to the respective positions shown in Figs. 13 and 14. The rounded outer end of rod 282 in the mandrel at station S4 engages a fixed cam 286 and is shifted to the left during the turret indexing operation (Fig. 18) so that plate 276 is free to move inwardly of the mandrel to the position of Fig. 12 and release the binding engagement of the mandrel against the inner walls of the finished can bodies just prior to a can ejecting operation. A plurality of studs 287, respectively mounted in the body of each mandrel and slidably received in each plate 276, limit the outward movement of the plates and prevent them from falling from position.

After a mandrel reaches station S4 with the finished can bodies thereon, an ejection mechanism operated in timed relation with the winding operations being performed at stations S1, S2, and S3 rapidly removes these finished can bodies from the mandrel. Each mandrel has an ejection collar 288 slidably mounted thereon and having a peripheral groove 289 for receiving a yoke 292 longitudinally reciprocable on a feed shaft 293. The yoke engages within a groove 289 of a collar at station S4 to shift that collar towards the right, as viewed in Fig. 12, and a shoulder 294 on the collar engages the end of a finished can body and forces all of the cans off of the mandrel out through the aperture formed by cut away portion 181. Shaft 293 is provided with a spiral thread 295 received within the hub of yoke 292 and causing its reciprocatory movement. Yoke 292 is also provided with an elongated guide slot 296 slidably receiving a guide rod 297 mounted in the frame, and a spring 298 on the yoke engages rod 297 to rock a track portion 299 of the yoke downwardly and into operative engagement with the groove 289 at station S4. Feed shaft 293 (Figs. 4, 5, and 15) carries a sprocket 301 connected by a chain 302 to a sprocket 303 on a shaft 304, and a gear 305 mounted on shaft 304 enmeshes with a gear 306 on shaft 40. Hence, a movement of segment 42 in a winding direction serves to shift the yoke 292 in an ejecting direction to remove the finished cans from the mandrel at station S4.

The following oscillation of segment 42 in an indexing direction rotates shaft 293 in an opposite direction, causing the yoke 292 to return the collar 288 with which it is engaged to its initial starting position (Figs. 12 and 15). During the indexing operation of the turret and while the yoke is being returned to its initial starting position, the mandrel at position S4 is shifted to the position S1, and the mandrel at position S3 is being shifted to the position S4. The collar engaged by the yoke is returned to its initial position while the indexing operation is taking place. The upper end of track 299 is cut away, as at 307, so that the track, in effect, is formed of a pair of intersecting arcs. Each collar 288 is further provided at its forward end with a conical portion 308. During the indexing operation, as sleeve 288 is being returned and at the same time is being indexed into its new position S1, this conical portion of the collar moving to station S4 engages the lower end of track 299 and rocks the lower end of the yoke outwardly so that the upper track portion 307 continues to be received within the groove 289 of the collar approaching station S1, and the lower track portion 299 slidably mounts this conical portion 308 and drops into the groove 289 of the collar when it reaches station S4. After the yoke aligns with this groove at station S4, spring 298 returns the yoke to the position shown in Fig. 16.

We claim as our invention:

1. In a machine for producing fiber can bodies, an indexible turret, a mandrel rotatably journalled on the turret, driving means, means operative alternately to connect and disconnect the turret and mandrel to the driving means, whereby the turret is indexed when connected and the mandrel rotated when connected, means to feed a flexible strip of material to the mandrel at one station to be convolutely wound on the mandrel and form a container, and means for applying a label to the container at a subsequent station.

2. In a machine for producing tubular can bodies, an indexible turret, a mandrel rotatably journalled on the turret, driving means, means operative alternately to connect and disconnect the turret and mandrel to the driving means, whereby the turret is indexed when connected and the mandrel rotated when connected, means to feed a flexible strip of material to the mandrel at one station to be convolutely wound on the mandrel and form an inner container, means to feed a second strip of material at the next station to be convolutely wound over the inner container, and mechanism to apply adhesive to said strips whereby the successive convolutions will adhere to form a unit can body.

3. In a machine for producing tubular can bodies, an indexible turret, a rotatable mandrel carried by the turret, driving means, means operative alternately to connect and disconnect the turret and mandrel to the driving means, whereby the turret is indexed when connected and the mandrel rotated when connected, means alternately operative to first index the turret means to feed a strip of flexible material to the mandrel at one station for a winding operation on the mandrel, means for feeding a second strip of flexible material to the mandrel at the succeeding station to be wound over said first strip, adhesive coating mechanisms for said strips causing them to adhere, and means to wind a label about the outer strip when the mandrel reaches another station.

4. In a machine for producing tubular can bodies, an indexible turret, a mandrel rotatable on the turret, driving means, means operative alternately to connect and disconnect the turret and mandrel to the driving means, whereby the turret is indexed when connected and the mandrel rotated when connected, mechanism for feeding a strip of flexible material to the mandrel at one station, labelling mechanism arranged to apply a label on the can body at another station, and means to eject the finished can bodies from the mandrel at a subsequent station.

5. In a machine for producing tubular can bodies, an indexible turret, a mandrel rotatable on the turret, driving means, means operative alternately to connect and disconnect the turret and mandrel to the driving means, whereby the turret is indexed when connected and the mandrel rotated when connected, means providing a dwell between each turret movement and each mandrel rotation, feeding mechanism respectively arranged to present strips of flexible material at successive stations during a dwell to be convolutely wound in superposed relation over the mandrel during mandrel rotation at said stations, adhesive coating devices for said strips, labelling mechanism arranged to apply a label on the can body at a third station, and means to eject the finished can bodies from the mandrel at a fourth station.

6. In a machine for producing tubular can bodies, an indexible turret, a mandrel rotatable on the turret, driving means, means operative alternately to connect and disconnect the turret and mandrel to the driving means, whereby the turret is indexed when connected and the mandrel rotated when connected, feeding means for individually and successively feeding separate strips of flexible material for convolute winding operations upon the mandrel at successive stations, an adhesive coating mechanism associated with each strip, a labelling device for applying a label to the mandrel when it reaches a subsequent station, and means to eject the finished can body when the mandrel reaches a final station.

7. In a machine for producing tubular can bodies, an indexible turret, a rotatable mandrel carried by the turret, driving means, means operative alternately to connect and disconnect the turret and mandrel to the driving means, whereby the turret is indexed when connected and the mandrel rotated when connected, mechanism for feeding a strip of flexible material to said mandrel at one of said stations for convolute winding operation about the mandrel, an adhesive coating device for said strip, and cut off devices intermediate of the feeding means and mandrel, and means operating said cut off devices operable in timed relation to the winding operations to cut off a predetermined extent of said strip during winding.

8. In a machine for producing tubular can bodies, an indexible turret, a rotatable mandrel on the turret, driving mechanism to rotatably index the turret to locate the mandrel to successive stations and to rotate the mandrel through a predetermined extent at each station, feeding mechanisms respectively arranged to present strips of flexible material to the mandrel at two of said successive stations for superposed winding operations on the mandrel, an adhesive coating device for each strip, cutters for longitudinally slitting the strips to form a plurality of can bodies, cut off devices arranged to cut off a predetermined length of each strip during the winding operations, and a labelling mechanism for applying a label to the can body at a third station.

9. In a machine for forming tubular can bodies, an indexible turret, a rotatable mandrel carried by the turret, means to index the turret to successive stations and to rotate the mandrel through a predetermined extent at each station, locking devices preventing simultaneous rotation of the turret and the mandrels, feeding means to apply strips of flexible material for successive superposed winding operations on the mandrel at two successive stations, adhesive coating devices associated with each strip, and means for applying a label to the can body when the mandrel reaches a third position.

10. In a machine for producing tubular can bodies, an indexible turret, a plurality of spaced mandrels carried by the turret, driving mechanism, means operative alternately to connect and disconnect the turret and mandrel to the driving mechanism, whereby the turret is indexed when connected and the mandrel rotated when connected, connections in said driving mechanism providing a dwell between each turret movement and the mandrel rotation, feeding means to simultaneously apply strips of flexible material during a dwell on the mandrels at two successive stations for simultaneous winding operations, adhesive coating devices for each strip, a labelling mechanism for successively applying labels to each can body at a third station, and means to automatically eject the finished can bodies from each mandrel when it reaches a final station.

11. In a machine for producing tubular can bodies, an indexible turret, a mandrel rotatable on the turret, driving mechanism for indexing the turret to successive stations and to rotate the mandrel at each station, connections in said driving mechanism providing a dwell between each turret movement and mandrel rotation, locking devices operable during said dwells and preventing simultaneous turret and mandrel rotation, means operable during a dwell to feed a strip of flexible material to the mandrel at one station for a winding operation on the mandrel, means operable during a dwell to apply a second strip of flexible material to the mandrel at a succeeding station for winding over said first strip, adhesive coating devices for said strips, a labelling mechanism operable during a dwell for presenting a label to the mandrel for winding over said second strip when the mandrel reaches a third station, and means to automatically eject the finished can bodies from the mandrel when it reaches a final station.

12. In a machine for producing tubular can bodies, an indexible turret, a rotatable mandrel carried by the turret, driving mechanism to index the turret to predetermined stations and to rotate the mandrel through a predetermined extent at each of said stations, connections in said driving mechanism causing each indexing movement and each mandrel rotation to assume a harmonic motion from a position of rest to a maximum speed and back to a position of rest, and feeding means for applying a strip of flexible material to the mandrel.

13. In a machine for producing tubular can bodies, an indexible turret, rotatable mandrels on the turret, driving mechanism to index the turret to successively locate the mandrels at successive stations and to rotate the mandrels through a predetermined extent at each of said stations, connections in said driving mechanism causing each turret movement and each mandrel rotation to assume a harmonic accelerated and decelerated movement, means for feeding a strip of flexible material to the mandrels at one of said stations, and means for applying a label at a subsequent station.

14. In a machine for producing tubular can bodies, an indexible turret, a rotatable mandrel on the turret, driving mechanism to index the turret to successive predetermined stations and to rotate the mandrels through a predetermined extent at each of said stations, connections in said driving mechanism causing each turret movement and each mandrel rotation to assume a harmonic accelerated and decelerated movement, locking devices preventing simultaneous rotation of the turret and mandrels, and feeding means for successively applying strips of flexible material to the mandrels at succeeding stations for superposed winding operations.

15. In a machine for producing tubular can bodies, an indexible turret, a rotatable mandrel carried by the turret, an eccentrically rotated member, an oscillatable gear segment having a substantially radial slot slidably and rotatably receiving said member, and operative connections between the gear segment, the turret, and mandrel to alternately index the turret and rotate the mandrel whereby the turret movement and mandrel rotation will successively accelerate and decelerate with substantially harmonic motions.

16. In a machine for producing tubular can bodies, an indexible turret, a rotatable mandrel on the turret, an eccentrically rotatable member, an oscillatable gear segment having a radial slot rotatably and slidably receiving said member, selective driving connections between said segment, turret and mandrel, means operated in timed relation to the movement of said segment to selectively connect the segment to the turret and mandrel and lock the non-engaged member against rotation, and mechanism associated with the segment causing a dwell between each turret movement and mandrel rotation.

17. In a machine for producing tubular can bodies, an indexible turret, a rotatable mandrel carried by the turret, means to index the turret to locate the mandrel at successive stations and to rotate the mandrel a predetermined extent at each of said stations, mechanism preventing simultaneous movement of the turret and rotation of the mandrel, feeding means for individually and successively feeding strips of flexible material for convolute superposed winding operations upon the mandrel at two successive stations, adhesive coating mechanism for each strip, suction mechanism securing the under strip to the mandrel during each winding operation, pressure rolls engaging convolutions of the strips during winding, a labelling device for applying a label to the outer strip when the mandrel reaches a third station, means to reduce the size of the mandrel when it reaches a fourth station, and means to eject the finished can bodies from the mandrel at said fourth station.

18. In a machine for producing tubular can bodies, an indexible turret, a rotatable mandrel on the turret, driving mechanism to index the turret to predetermined stations and to rotate the mandrel at each station, means to present a strip of flexible material to the mandrel at one station prior to a mandrel rotation, means to feed the strip for a winding operation upon the mandrel, and adjustable mechanism to automatically vary the rate of strip feed in response to the strip presenting and winding operations.

19. In a machine for producing tubular can bodies, an indexible turret, a rotatable mandrel on the turret, driving mechanism to index the turret to successive stations and to rotate the mandrel through a predetermined extent at each of said stations, means for rotatably supporting a roll of paper strip stock, a feed table receiving said strip, means for moving the table for intermittently presenting the strip to the mandrel at one station for a winding operation on the mandrel, means connected to the driving mechanism to unwind the roll of stock, and a variable driving connection between the driving mechanism and said roll driving means to vary the feed of paper stock in response to the table movement and winding operation.

20. In a machine for producing tubular can bodies, an indexible turret, a rotatable mandrel on the turret, means to index the turret to successive stations and to rotate the mandrel through a predetermined extent at each station, feeding tables to present strips of flexible material from supply rolls to the mandrel at two successive stations for superposed winding operations on the mandrel, variable driving means for unwinding said rolls, and control mechanisms respectively supported in depending loops of said strips for automatically varying the strip feed to said stations.

21. In a machine for producing tubular can bodies, a rotatable mandrel, means for rotating the same to convolutely wind a strip of paper thereabout, means for leading a strip of paper to said mandrel and including a feed table, means for moving the feed table towards the mandrel so as to feed the forward edge of the strip onto the mandrel and then move the feed table away from the mandrel, and means adjacent the forward end of the feed table for cutting off the strip during the winding operation and after the feed table has been withdrawn from the mandrel.

22. In a machine for producing tubular can bodies, an indexible turret, a mandrel rotatable on the turret, driving means to index the turret to locate the mandrel at successive stations and rotate the mandrel at each station, means for feeding a strip of flexible material for convolutely winding it upon the mandrel at one station and thus form a tubular container, a label pocket for supporting a stack of labels and located at a labelling station, pivotal means supporting the pocket so that one end of the pocket and the labels therein will swing towards and from the mandrel at the labelling station, cam means operated by the driving mechanism to swing the pocket towards the mandrel and present one end of a label against the container at said station, and means operated by said cam to shift the pocket longitudinally after the label has been engaged with the container whereby to buckle the top label and thus free it from the next succeeding label.

23. In a machine for producing can bodies, an indexible turret, mandrels rotatably journalled thereon, means for alternately indexing the turret to successive stations and for rotating the mandrels when indexed at the stations, and means for preventing rotation of the mandrels during indexing and for preventing indexing of the turret during rotation of the mandrels.

24. In a machine for producing can bodies, an indexible turret, mandrels rotatably journalled thereon, driving means, a clutch adapted to connect said driving means for indexing said turret, a second clutch adapted to connect said mandrels for rotation thereof, and means for selectively engaging said clutches with said driving means.

25. In a machine for producing can bodies, an indexible turret, mandrels rotatably journalled thereon, driving means, a rotatable clutch adapted to connect said driving means to said turret for indexing same, a second rotatable clutch adapted to connect said mandrels to said driving means for rotation thereof, means for simultaneously shifting said clutches, and means controlling said shifting means for selectively engaging one of said clutches with the driving means.

26. In a machine for producing can bodies, an indexible turret, mandrels rotatably journalled thereon, driving means, a rotatable clutch adapted to connect said driving means to said turret for indexing same, a second rotatable clutch adapted to connect said mandrels to said driving means for rotation thereof, means for simultaneously shifting said clutches, means controlling said shifting means for selectively engaging one of said clutches with the driving means, and means for locking the disengaged clutch.

27. In a machine of the character described, driving means, driven means, a rotatable turret, a rotatable mandrel carried on said turret, means for selectively engaging said turret and mandrel to said driven means, and reversing means intermediate of said driving means and driven means, whereby said driven means will index said turret when driven in one direction and rotate said mandrel when driven in the other direction.

28. In a machine of the character described, driving means, driven means, a rotatable turret, a rotatable mandrel carried on said turret, means for selectively engaging said turret and mandrel to said driven means, reversing means intermediate of said driving means and driven means, whereby said driven means will index said turret when driven in one direction and rotate said mandrel when driven in the other direction, and means controlled by said driving means for controlling said selectively engaging means.

29. In a machine of the character described, constantly rotating driving means, rotatable driven means, a rotatable turret, a rotatable mandrel carried on said turret, means for selectively engaging said turret and mandrel to said driven means, and reversing means intermediate of said constantly rotating driving means and said driven means, whereby said driven means will be rotated in one direction to index said turret and then reversed and rotated in another direction to rotate said mandrel.

30. In a machine of the character described, driving means, driven means, a rotatable turret, a rotatable mandrel carried on said turret, rotatable ejecting means, means for selectively engaging said turret and mandrel to said driven means, and reversing means intermediate of said driving means and said driven means whereby said driven means will rotate said mandrel and said ejector when driven in one direction and index said turret and reverse the direction of said ejecting means when driven in the other direction.

31. In a machine of the character described, constantly rotating driving means, rotatable driven means, a rotatable turret, a rotatable mandrel carried on said turret, means for selectively engaging said turret and mandrel to said rotatable driven means, and reversing means intermediate of said constantly rotating driving means and said driven means, means providing a dwell between each reversal of said driven means, and means controlled by said constantly rotating driving means for controlling said selectively engaging means.

32. In a machine of the character described, constantly rotating driving means, rotatable driven means, a rotatable turret, a rotatable mandrel carried on said turret, means for selectively engaging said turret and mandrel to said driven means, and reversing means intermediate of said driving means and driven means whereby said driven means will index said turret when driven in one direction and rotate said mandrel when driven in the other direction, means for feeding a strip of paper to the mandrel, means for severing said strip during rotation of the mandrel, and means controlled by the constantly rotating driving means for feeding and severing said strip in timed relation to the operation of said driven means.

33. In a machine for producing tubular can bodies, an indexible turret, a rotatable mandrel carried by the turret, driving mechanism to index the turret to predetermined stations and to rotate the mandrel when indexed at each station, and a reciprocating connection in said driving mechanism adapted when moved in one direction to index the turret and when moved in another direction to rotate the mandrel.

34. In a machine for producing can bodies, an indexible turret, a rotatable mandrel carried by said turret, an eccentrically rotated member, a reciprocating member driven by said rotating member, and operative connections between the reciprocating member, turret, and mandrel to index the turret upon movement of the reciprocating member in one direction and to rotate the mandrel upon movement of the member in the other direction.

35. In a machine for producing tubular can bodies, a mandrel, means for feeding a strip of flexible material to the mandrel to wind a can body thereon, means for ejecting the can body from the mandrel comprising a rotatable spiral member, means for rotating said member first in one direction and then in another direction, and a follower adapted to engage the end of said can body and to be moved longitudinally by said rotatable spiral member.

36. The method of simultaneously producing a plurality of fiber can bodies, comprising the steps of simultaneously feeding a pair of wide continuous flexible strips through adhesive coating devices, convolutely winding a portion of the first strip onto a mandrel while severing said strip into a plurality of widths as it is being wound, transversely cutting off said strip during the winding operation, indexing the mandrel to a second station, convolutely winding said second strip into adhesive engagement with the first strip while severing said second strip into a plurality of widths to overlie said first widths, then transversely cutting off a portion of said second strip widths.

37. In a machine of the character described, the combination of a plurality of mandrels, means for feeding a continuous strip to each mandrel, cutting means carried by said feeding means for dividing said strips longitudinally into a plurality of widths, means for winding the strips around each mandrel in succession in superposed relation, and means associated with each mandrel for transversely cutting off predetermined lengths of the divided strip when wound thereon.

38. In a machine of the character described, the combination of a series of mandrels, a turret carrying said mandrels, driving means, means operative alternately to connect the turret and mandrel to the driving means, whereby the turret is indexed when connected to the driving means to present the mandrels at different stations and the mandrels rotated when connected and positioned at the stations, means at each station for feeding a continuous strip of material to the mandrel, and means at each station for cutting off a predetermined length of the strip while being wound on the mandrel.

39. In a machine of the character described, an indexible turret, a plurality of rotatable mandrels carried on said turret, means for alternately indexing said turret and then rotating said mandrels, and means interrupting operation of said indexing and rotating means between alternate operations thereof.

40. In a machine of the character described, a rotatable turret, a plurality of rotatable mandrels carried on the turret, driven means for alternately indexing said turret and then rotating said mandrels, driving means for operating said driven means, and means for breaking the drive connection between said driving and driven means between the indexing of the turret and rotation of the mandrels.

41. In a machine for producing can bodies, a rotatable mandrel, means for feeding a continuous strip of material to the mandrel, cutting means intermediate of the feeding means and mandrel comprising a pair of separable members adapted when open to lie one above and one below the feed means, means for moving said feeding means towards and from said mandrel to lead the strip of material between the separable members of said cutting means, and means for actuating said cutting means to sever the strip after said feeding means has been withdrawn from between same.

42. In a machine of the character described, an indexible turret, a rotatable mandrel carried by the turret, driving mechanism to index the turret to predetermined stations and to rotate the mandrel through a predetermined extent at each of said stations, and connections in said driving mechanism causing each indexing movement and each mandrel rotation to assume a substantially harmonic motion from a position of rest to a maximum speed and back to a position of rest.

43. The method of producing lined fiber can bodies, which comprises the leading of a continuous web of thin, flimsy material to a mandrel, convolutely winding the material on the mandrel while adhesively treating the outer surface thereof, severing said strip after a sufficient length has been wound to provide an overlap, then leading a second continuous web of a body material to the mandrel, and bringing one surface thereof into engagement with the adhesively coated surface of the prior wound material, then convolutely winding the second strip around the wound lining and around itself into a series of coils, while applying adhesive to the outer surface thereof, and then severing said web when a predetermined length has been wound thereon.

44. The method of producing lined fiber can bodies, which comprises convolutely winding, while adhesively treating the outer surface thereof, a sufficient length of a continuous web of a thin, flimsy material onto a supporting mandrel to make a one ply lining with an overlapped adhesively joined seam, severing said web when said length has been wound thereon, winding over said thin, flimsy material a sufficient length of a heavy fibrous body material to make a plurality of plies, while adhesively treating the outer surface thereof, and then cutting said second web when a sufficient length has been wound.

45. In a machine for producing can bodies, an indexible turret, a rotatable mandrel on the turret, means for feeding a strip to the mandrel, driving means, means operative alternately to connect and disconnect the turret and mandrel to the driving means, whereby the turret is indexed when connected and the mandrel rotated when connected, and means for cutting off the strip while said strip is being drawn onto the mandrel and during rotation of the mandrel.

46. In a machine for producing can bodies, an indexible turret, a plurality of rotatable mandrels on the turret, driving mechanism, means operative alternately to connect and disconnect the turret and mandrel to the driving mechanism, whereby the turret is indexed when connected and the mandrels rotated when connected, connections in said driving mechanism providing a dwell between each turret and mandrel rotation, means operable during a dwell to successively feed strips of flexible material to said mandrels at successive stations to wind a tubular body thereon, and means to successively eject the tubular body from said mandrels at another station.

47. The method of producing lined fiber can bodies, which comprises winding, while adhesively treating the outer surface thereof, a length of thin flimsy material onto a supporting mandrel, the length of said material being sufficient to cause it to overlap upon itself to provide an overlapped adhesively joined seam, thereby securing the thin flimsy material into tubular form, and thereafter bringing the under surface of a heavy fibrous material into engagement with the adhesively coated surface of the thin material, then winding the heavy material around the thin material to adhesively secure the heavy material to the thin material and continuing the winding of the heavy material to make a plurality of plies, while adhesively treating the outer surface thereof, whereby each successive ply will be adhesively secured to the preceding ply, and thus producing a substantially one-piece rigid lined fiber container.

ALEXANDER G. HATCH.
ROBERT S. CONDON.